US010672522B2

(12) United States Patent
Heibel

(10) Patent No.: US 10,672,522 B2
(45) Date of Patent: Jun. 2, 2020

(54) MAGNETO-RHEOLOGICAL FLUID BASED FILTER/REFLECTOR

(71) Applicant: Westinghouse Electric Company LLC, Cranberry Township, PA (US)

(72) Inventor: Michael D. Heibel, Harrison City, PA (US)

(73) Assignee: Westinghouse Electric Company LLC, Cranberry Townhip, PA (US)

( * ) Notice: Subject to any disclaimer, the term of this patent is extended or adjusted under 35 U.S.C. 154(b) by 1602 days.

(21) Appl. No.: 14/617,144

(22) Filed: Feb. 9, 2015

(65) Prior Publication Data

US 2016/0232995 A1   Aug. 11, 2016

(51) Int. Cl.
| | |
|---|---|
| G21C 7/06 | (2006.01) |
| G21C 7/00 | (2006.01) |
| G21C 11/06 | (2006.01) |
| G21C 7/24 | (2006.01) |
| G21F 1/00 | (2006.01) |
| G21F 3/00 | (2006.01) |

(52) U.S. Cl.
CPC .............. *G21C 7/00* (2013.01); *G21C 7/24* (2013.01); *G21C 11/06* (2013.01); *G21F 1/00* (2013.01); *G21F 3/00* (2013.01); *Y02E 30/39* (2013.01)

(58) Field of Classification Search
CPC ............ G21C 7/00; G21C 7/24; G21C 11/06
USPC ........................................................ 376/221
See application file for complete search history.

(56) References Cited

U.S. PATENT DOCUMENTS

| 3,383,285 A * | 5/1968 | Ackroyd ............... G21C 7/28 376/171 |
| 6,971,491 B1 | 12/2005 | Gordaninejad et al. |
| 8,064,564 B2 | 11/2011 | Singleton |
| 8,615,065 B2 | 12/2013 | Balog |
| 2004/0062340 A1* | 4/2004 | Peterson ............... G21C 1/07 376/383 |
| 2004/0085613 A1 | 5/2004 | Lassar |
| 2008/0273650 A1 | 11/2008 | Yokoyama et al. |
| 2013/0186473 A1* | 7/2013 | Mankame ........... F15B 21/065 137/13 |
| 2015/0357056 A1* | 12/2015 | Shaver ................ G21C 7/28 376/220 |

FOREIGN PATENT DOCUMENTS

| DE | 10 2012 223737 A1 | 6/2014 |
| WO | WO2014204537 | 12/2014 |

OTHER PUBLICATIONS

Westinghouse Electric Company LLC, PCT/US2016/014481 International Search Report, dated May 17, 2016, 11 pages.
Extended European Search Report, 16749575.3-1212 / 257051 PCT/US2016014481, 8 Pages.

* cited by examiner

*Primary Examiner* — Marshall P O'Connor
(74) *Attorney, Agent, or Firm* — K&L Gates LLC

(57) ABSTRACT

A magneto-rheological filter/reflector that controls the transmissivity of any form of electromagnetic or particulate radiation through the filter by varying discrete electromagnetic fields across a magneto-rheological fluid. In one embodiment, the filter/reflector controls the rate of the nuclear reaction within the core of a reactor without any moving parts.

12 Claims, 5 Drawing Sheets

MAGNETO-RHEOLOGICAL FLUID BASED FILTER/REFLECTOR

BACKGROUND

1. Field

This invention pertains in general to radiation filters/reflectors and, in one particular embodiment, more specifically to a variable neutron reflector for a nuclear reactor core.

2. Related Art

In a nuclear reactor for power generation, such as a pressurized water reactor, heat is generated by fission of a nuclear fuel such as enriched uranium, and transferred to a coolant flowing through a reactor core. The core contains elongated nuclear fuel rods mounted in proximity to one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on fissile material in adjacent fuel rods, contributing to the nuclear reaction and to the heat generated by the core.

Movable control rods are dispersed throughout the nuclear core to enable control of the overall rate of the fission reaction, by absorbing a portion of the neutrons, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rods reduces the extent of neutron absorption and increases the rate of the nuclear reaction and the power output of the core.

FIG. 1 shows a simplified conventional nuclear reactor primary system, including a generally cylindrical pressure vessel 10 having a closure head 12 enclosing a nuclear core 14 that supports the fuel rods containing the fissile material. A liquid coolant, such as water or borated water, is pumped into the vessel 10 by pump 16 through the core 14 where heat energy is absorbed and is discharged to a heat exchanger 18 typically referred to as a steam generator, in which heat is transferred to a utilization circuit (not shown) such as a steam driven turbine generator. The reactor coolant is then returned to the pump 16 completing the primary loop. Typically, a plurality of the above-described loops are connected to a single reactor vessel 10 by reactor coolant piping 20.

Commercial power plants employing this design are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is surrounded by a compact high pressure containment. Due to both limited space within the containment and the low cost requirement for integral pressurized light water reactors, the overall number of auxiliary systems needs to be minimized without compromising safety or functionality. For that reason, it is desirable to maintain most of the components in fluid communication with the primary loop of the reactor system within the compact, high pressure containment.

Typical control rod drive mechanism used in existing and proposed small modular reactors require moving parts to be positioned in locations where mechanical and electro-mechanical failure of the mechanism represents a serious operating concern. It is very difficult or impractical to repair failures associated with these control mechanisms and associated position indication sensors while the reactor is operating.

Conventionally, some reactors have employed dense materials to surround a reactor core with the dense materials having a high potential to produce large angle scattering collisions with escaping neutrons, and a low absorption potential, to minimize the neutron leakage from the reactor. This type of material is said to "reflect" escaping neutrons back into the reactor where they can contribute to additional fission reactions. The result is that less reactivity or fissionable material is needed to create a critical reactor configuration. Given a critical reactor configuration with no reflector, the addition of a reflector allows the fission reaction rate in the core to increase, thus producing a higher power level.

It is an object of this invention to replace the functionality of some or all of the control rod drive mechanisms with moving parts with a system with no moving parts.

It is a further object of this invention to provide such a system with no moving parts that is wholly contained outside the core.

SUMMARY

These and other objects are achieved employing a device in which an albedo of the device can be varied, for controlling the transmission of radiation from a source on a first side of the device to a second location on a second side of the device. The device comprises a fluid reservoir containing a magneto-rheological fluid in an interior of the fluid reservoir. A magnetic field generator is positioned on the outside of the reservoir for establishing a magnetic field across the magneto-rheological fluid. A control system controls the magnetic field generator to vary the magnetic field across the magneto-rheological fluid to change the albedo of the device in accordance with a demand signal. In one preferred embodiment, the device is a nuclear reflector supported around at least a portion of a circumference of a core of the nuclear reactor with the nuclear reflector having at least a first state and a second state wherein the strength of the magnetic field is varied by the control system to change the nuclear reflector between the first state and second state to change the albedo of the device. Preferably, the magnetic field is established along an axial direction of the core of the nuclear reactor and desirably, the magnetic field is a plurality of discrete magnetic fields spaced around a circumference of the core of the nuclear reactor. Desirably, the plurality of discrete magnetic fields are respectively established by a plurality of independently operated electromagnets.

In one embodiment, the device includes a monitoring system connected to the control system, for monitoring the radiation on the second side of the device and controlling the magnetic field to control a level of the radiation on the first side of the device through a program directing the demand signal. Preferably, the demand signal is a power demand signal of the reactor.

In still another embodiment, the demand signal controls a level of the nuclear reactions within the core of the nuclear reactor by changing the magnetic field. In one such embodiment, the change in the magnetic field is the primary mechanism for controlling the nuclear reactions within the core during normal operation of the reactor. Preferably, if power is lost to the magnetic field generator, the magneto-rheological fluid transitions to a state that shuts down the reactor.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
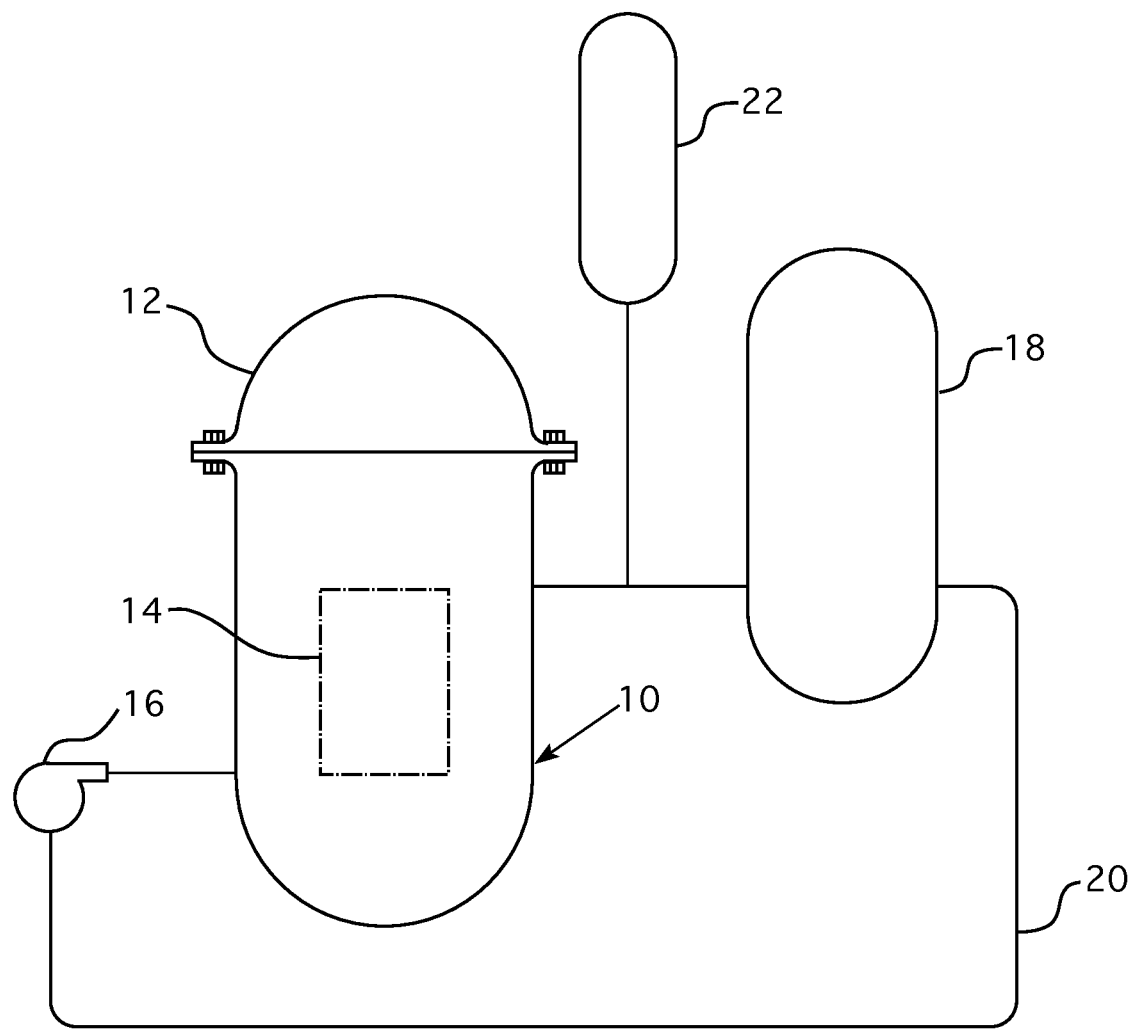
FIG. 1 is a simplified schematic of a conventional nuclear reactor system.
Figure 2:
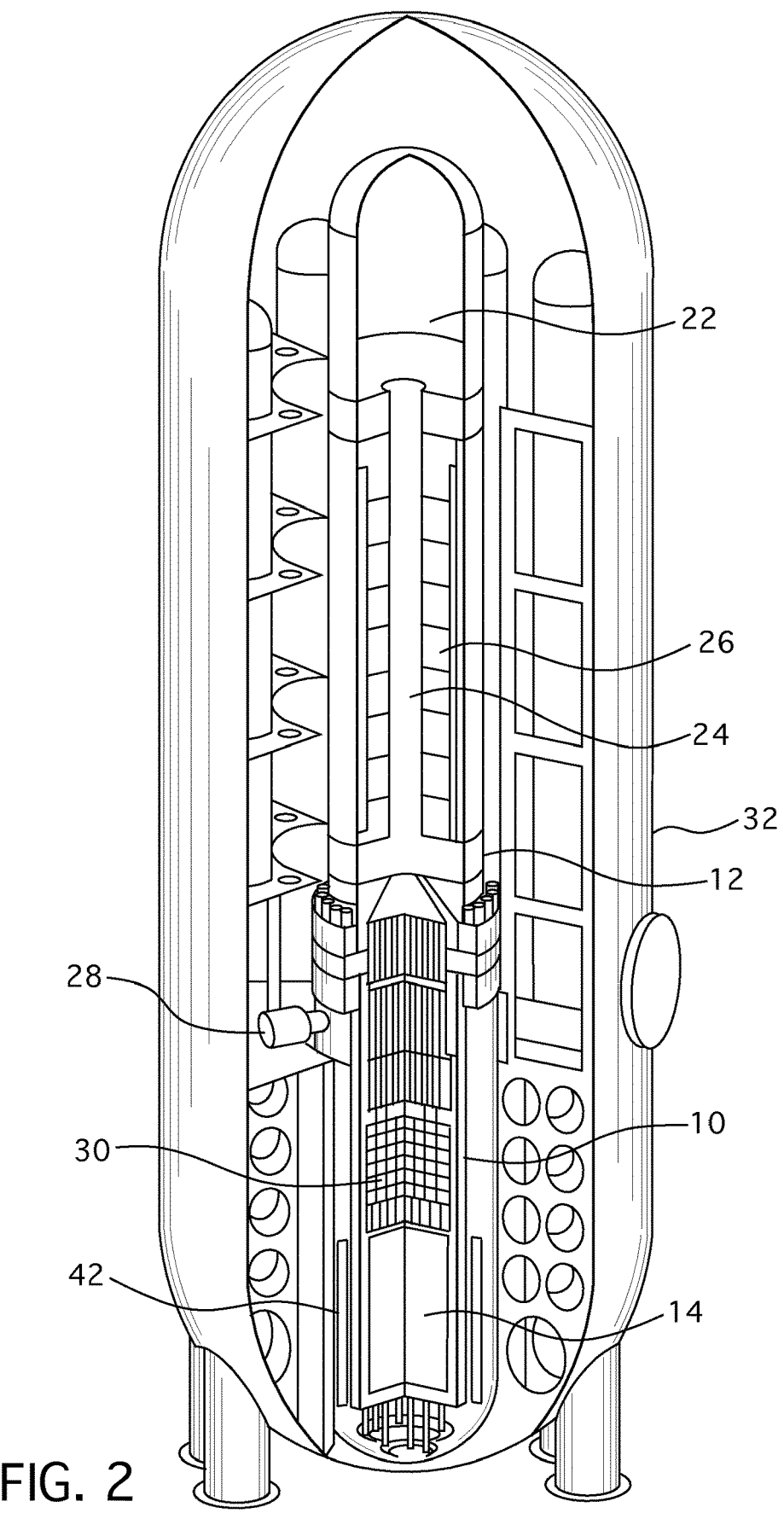
FIG. 2 is a perspective view, partially cut away, showing a small modular integral reactor system incorporating one embodiment of this invention.
Figure 3:
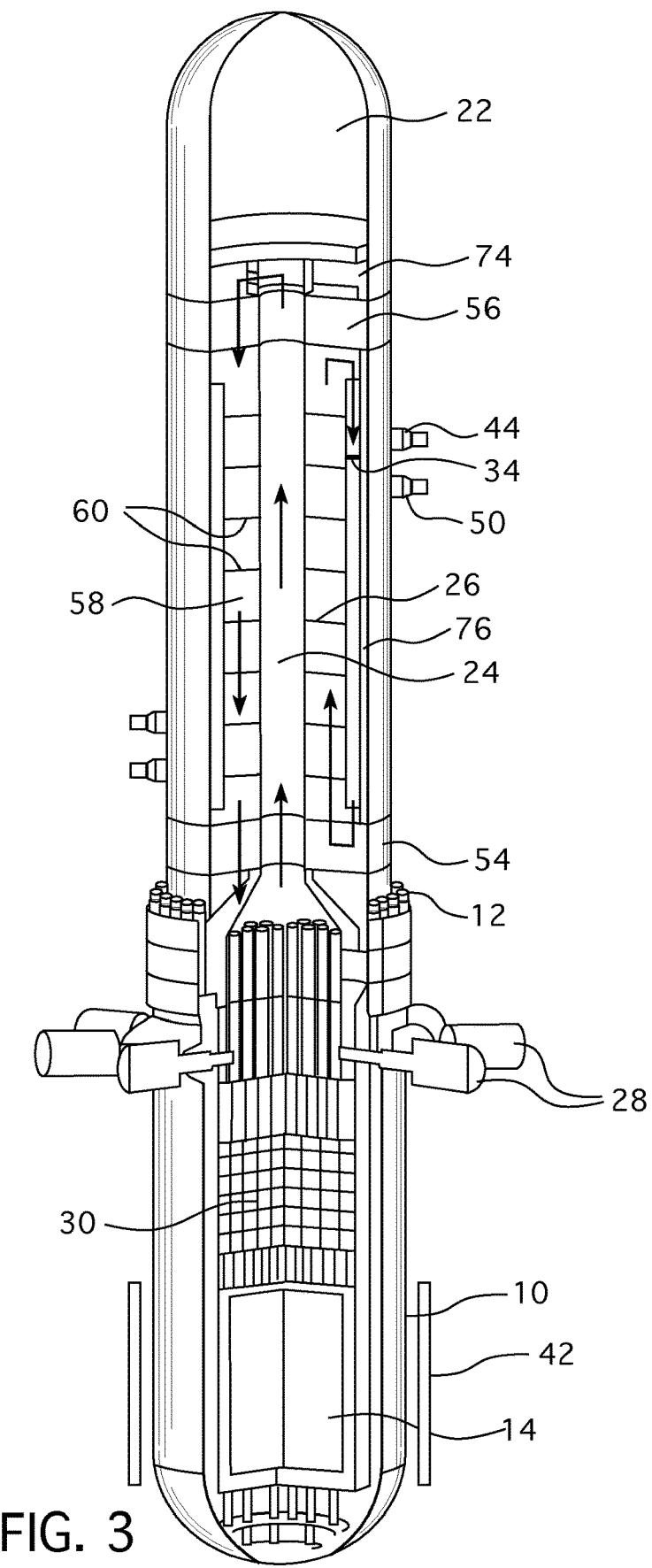
FIG. 3 is an enlarged view of the reactor shown in FIG. 2 employing a second embodiment of this invention.

FIGS. 2 and 3 illustrate a small modular reactor design which can benefit from the control system of this invention for controlling the rate of the nuclear reactions within the core 14. FIG. 2 shows a perspective view of the reactor containment of a modular reactor design to which this invention can be applied. The reactor containment illustrated in FIG. 2 is partially cut away, to show the reactor pressure vessel 10 and its integral, internal components. FIG. 3 is an enlarged view of the reactor pressure vessel shown in FIG. 2. Like reference characters are used among the several figures to identify corresponding components.

In an integral pressurized water reactor such as illustrated in FIGS. 2 and 3, substantially all of the components typically associated with the primary side of a nuclear steam supply system are contained in a single reactor pressure vessel 10 that is typically housed within a high pressure containment vessel 32 capable of withstanding pressure of approximately 2500 psig, along with portions of the safety systems associated with the primary side of the nuclear steam supply system. The primary components housed within the pressure vessel 10 include the primary side of the steam generator, reactor coolant pumps 28, the pressurizer 22 and the reactor itself. The steam generator system 18 of a commercial reactor, in this integral reactor design, is separated into two components, a heat exchanger 26 which is located in the reactor vessel 10 above the reactor upper internals 30 and a steam drum (not shown in the drawings) which is maintained external to the containment 32. The steam generator heat exchanger 26 includes within the pressure vessel 10/12, which is rated for primary design pressure and is shared with the reactor core 14 and other conventional reactor internal components, two tube sheets 54 and 56, hot leg piping 24 (also referred to as the hot leg riser), heat transfer tubes 58, which extend between the lower tube sheet 54 and the upper tube sheet 56, tube supports 60, secondary flow baffles 36 for directing the flow of the secondary fluid medium among the heat transfer tubes 58 and secondary side flow nozzles 44 and 50.

The heat exchanger 26 within the pressure vessel head assembly 12 is thus sealed within the containment 32. The external-to-containment steam drum is comprised of a pressure vessel, rated for secondary design pressure. The external-to-containment steam drum includes centrifugal-type and chevron-type moisture separation equipment, a feed water distribution device and flow nozzles for dry steam, feed water, recirculating liquid and wet steam, much as is found in a conventional steam generator design 18.

The flow of a primary reactor coolant through the heat exchanger 26 in the head 12 of the vessel 10 is shown by the arrows in the upper portion of FIG. 3. As shown, heated reactor coolant exiting the reactor core 14 travels up and through the hot leg riser 24, through the center of the upper tube sheet 56 where it enters a hot leg manifold 74 where the heated coolant makes a 180 degree turn and enters the heat transfer tubes 58 which extend through the upper tube sheet 56. The reactor coolant then travels down through the heat transfer tubes 58 that extend through the lower tube sheet 54 transferring its heat to a mixture of recirculated liquid and feed water that is entering the heat exchanger through the sub-cooled recirculation input nozzle 50 from the external steam drum, in a counterflow relationship. The sub-cooled recirculating liquid and feed water that enters the heat exchanger 26 through the sub-cooled recirculation input nozzle 50 is directed down to the bottom of the heat exchanger by the secondary flow baffles 36 and up and around heat exchange tubes 58 and turns just below the upper tube sheet 56 into an outlet channel 76 where the moisture-laden steam is funneled to the wet steam outlet nozzle 44. The wet saturated steam is then conveyed to the external steam drum where it is transported through moisture separators which separate the steam from the moisture. The separated moisture forms the recirculated liquid which is combined with feed water and conveyed back to the sub-cooled recirculation input nozzle 50, to repeat the cycle.

Control of the fission process in the core of these types of conventional reactors is largely provided by the control rods. Typical control rod drive mechanisms used in many conventional reactors require moving parts to be positioned in locations where mechanical and electro-mechanical failure of the mechanisms represents a serious operating concern. It is very difficult or impractical to repair failures associated with these control mechanism and associated position indication sensors while the reactor is operating. There is a need to replace or greatly supplement the functions required to be performed by the control rods that does not require moving parts inside the reactor vessel or reactor core. This invention provides a device and associated application methodology for adjusting the core reactivity balance without use of any moving mechanical equipment and associated position sensors.

Figure 4:
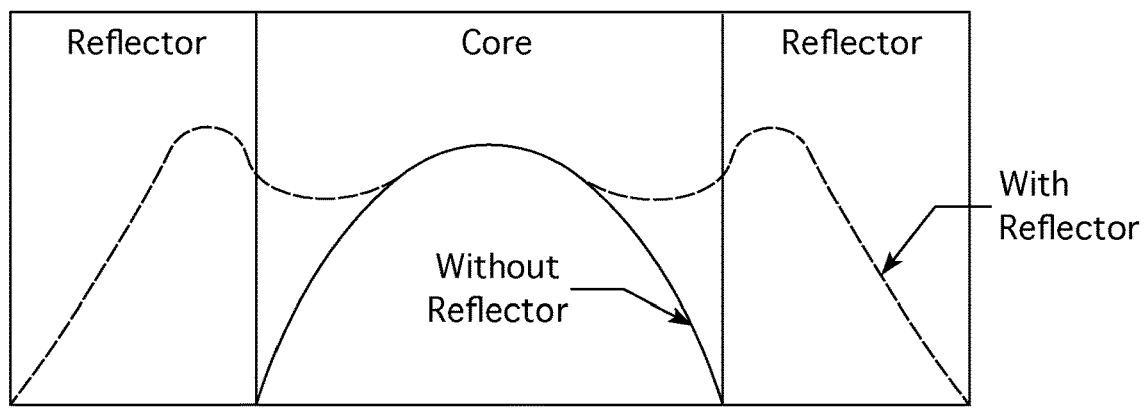
FIG. 4 is a graphical representation of the relative radial neutron distribution with and without a neutron reflector.

The core reactivity balance of a nuclear reactor may be significantly affected by changing the number of neutrons that leak out of the reactor core and do not return to contribute to the amount of fission occurring inside the reactor. This fact is well understood by those skilled in the art of nuclear engineering. A static hardware device, such as that described in U.S. Pat. No. 8,615,465, is often installed around nuclear reactors specifically to reduce the number of neutrons that leak out of the reactor core before they contribute to the fission rate inside the reactor. These devices are given the general term "reflector" since they act as if neutrons exiting the core region are reflected back inside the core. Use of a suitable reflector allows the amount of power generated by a given amount of uranium inside the reactor core over a fixed time interval to be increased. Another way to describe this effect is that the reflector increases the core reactivity. Consequently, if one changes the properties of the reflector, the core reactivity is affected. Changes in core reactivity will change the core power level. Hence, being able to control changes in the neutron reflection properties of the neutron reflector will control the core power level. FIG. 4 is a graphical illustration of the relative neutron distribution with and without the use of a neutron reflector.

The neutron reflector effectiveness is often indicated by the term "albedo." The albedo of the reflector is defined to be the ratio of the number of neutrons entering the reflector to the number returned to the core region. If all the neutrons entering the reflector region return to the core, the albedo is 1.0. This situation will provide a maximum positive contribution to core reactivity. Water has an albedo of approximately 0.8. The density and material composition of the reflector determine the albedo. Steel produces a higher albedo than water. Being able to effectively change the density and material composition of the reflector during core power operation will therefore provide the ability to control the core power without the use of control rods or chemical shim changes.

Figure 5:
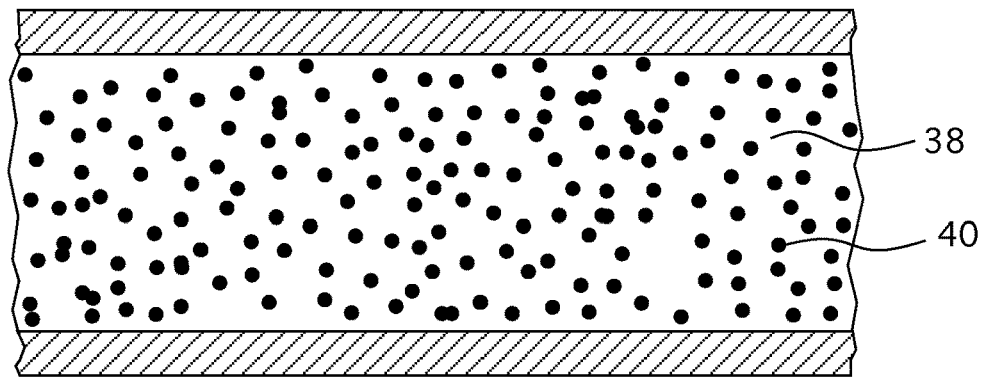
FIG. 5 is a schematic representation of the distribution of magnetic particles within a magneto-rheological fluid without a magnetic field applied.
Figure 6:
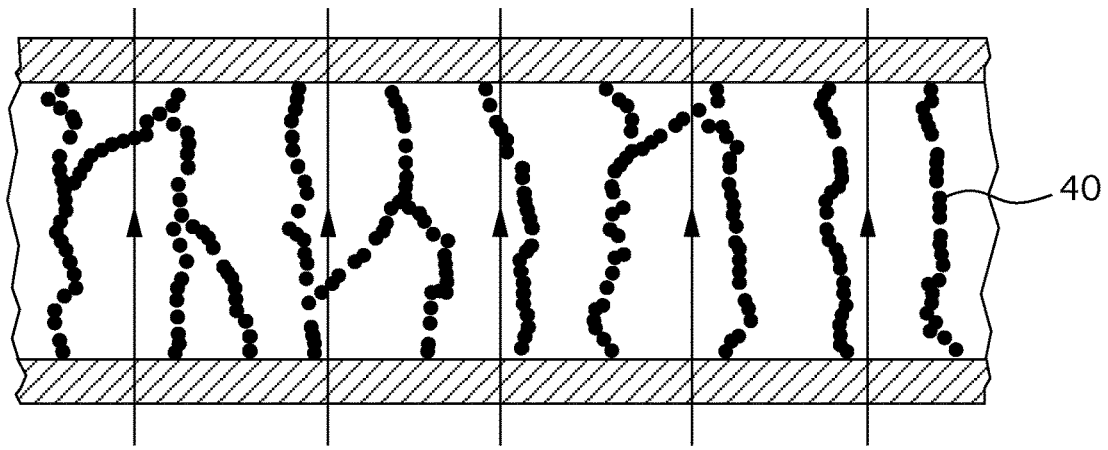
FIG. 6 is a schematic representation of the distribution of magnetic particles in the fluid of FIG. 4 in the presence of an applied magnetic field.

A magneto-rheological fluid has effective density and composition properties that change when a magnetic field is applied across the fluid. The typical magneto-rheological fluid comprise very small ferro-magnetic spheres 40 suspended in some type of viscous oil 38 as shown in FIG. 5. The magnetic particles which are typically micrometer of nanometer scale spheres or ellipsoids, are suspended within the carrier oil 38, and are distributed randomly and in suspension under normal circumstances. When a magnetic field is applied, however, the microscopic particles (usually in the 0.1-10 micrometer range) align themselves along the lines of magnetic flux as illustrated in FIG. 6, where the arrows indicate the direction of the magnetic flux.

The object of this invention is to control the density of the ferro-magnetic particles in the fluid and the impact the metal density in the fluid has on the reflector properties. When the magnetic field is applied, the ferro-magnetic particles line up along the lines of magnetic field strength between the north and south poles of the magnets. This alignment creates gaps of fluid that preferentially either absorb or forward diffused neutrons preventing them from returning to the reactor core. This effectively reduces the neutron scattering cross section of the reflector which reduces the albedo.

Figure 7:
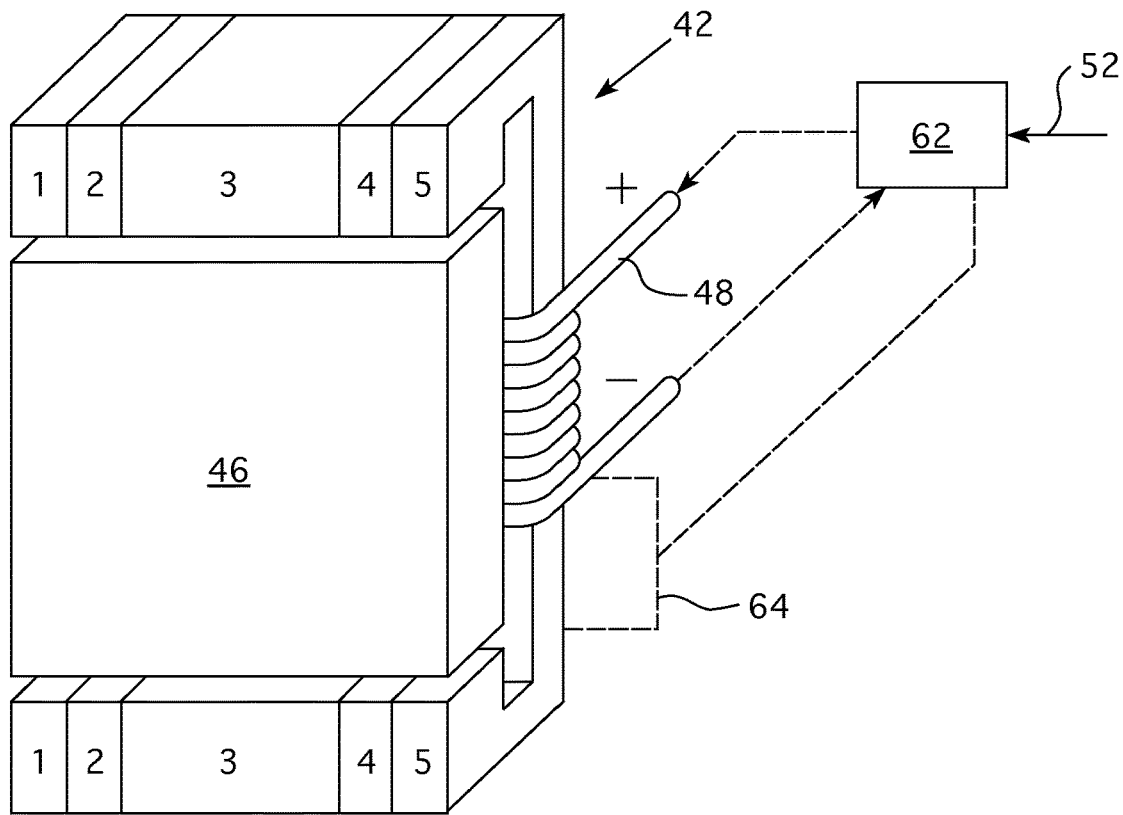
FIG. 7 is a schematic of one embodiment of this invention for controlling the radial power distribution.
Figure 8:
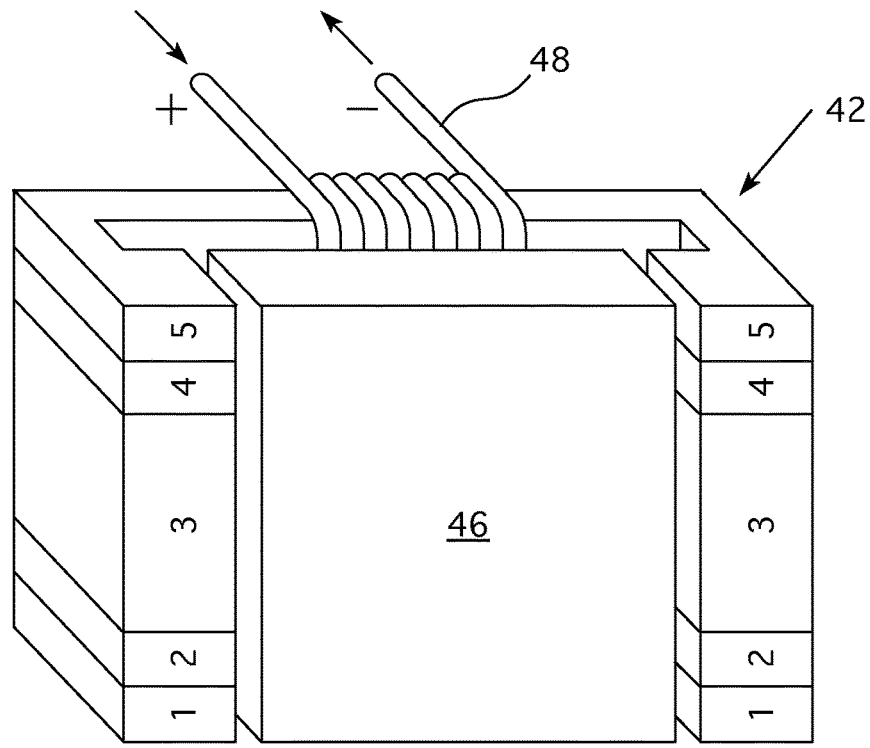
FIG. 8 is a schematic shown in FIG. 7 rotated 90 degrees for controlling the axial power distribution.

The preferred embodiment of this device controls the radial neutron leakage from one or more of the sides of a small reactor type. An example of this type of reactor is the integral modular reactor described above or a typical TRIGA-style pool reactor. This reflector can operate effectively inside the reactor vessel as shown in FIG. 2 by reference character 42 where it is placed around the core between the reactor vessel and the core barrel, or it can work by being positioned outside the reactor vessel as shown in FIG. 3. Preferably, each face of the reactor core will have its own device with the capability for independent control. The device comprises a series of independently controlled electromagnets and a non-ferromagnetic fluid tank containing the magneto-rheological fluid. The magneto-rheological fluid comprises very small ferromagnetic particles (e.g., —Fe, FE-W—Ni alloys) in a suspension with a viscous liquid with a viscosity low enough to allow rapid movement of the magnetic particles when under the influence of the forces produced by the magnetic fields. FIGS. 7 and 8 schematically illustrate electromagnets numbered 1 through 5 that cause the distribution of magnetic particles in the magneto-rheological fluid to preferentially locate in the areas of the highest magnetic field strength. This action collects the metals that compose the suitable neutron reflector into a small effective area in the magneto-rheological fluid. Since the fluid particles in this configuration do not serve as good neutron reflector materials, neutron leakage out of the reactor will increase significantly adjacent to the areas of highest magnetic particle concentration, and decrease in the areas where the more suitable reflector material concentration is forced to increase. The magneto-rheological fluid is supported within the panel 46 which is positioned between the north and south poles of the electromagnets 1-5 that are individually controlled and electrically powered from a source 48. Each of the magnets 1-5 is separately controlled to respectively create discrete, independent magnetic fields. Using the configuration illustrated in FIG. 7 and applying currents to electro magnets 1 and 5 will draw the magnetic particles away from the center of the panel 46 containing the magneto-rheological fluid, increasing the leakage from a larger area about the center of the panel. This action will increase neutron leakage from the majority of the most significant areas of the reactor and cause reactor power to decrease. In order to increase reactor power, the current supplied to electro magnets 1 and 5 is eliminated, and current is supplied to electro magnet 3. Electro magnets 2 and 4 are used to re-establish a uniform magnetic particle and liquid neutron reflective material distribution once the desired power level has been established. The same principle can be used to reshape the radial power distribution. In a similar way the configuration shown in FIG. 8 can be used to reshape the axial power distribution.

The control of the current supplied to each of the electromagnets is determined primarily from a reactor power demand signal. There is a feedback to the current supply controller 62 based on signals from prompt responding neutron detectors 64 (e.g., —Pt, Co detectors) located immediately behind the fluid tank 46 of the reflector 42. The controller 62 receives information on reactor power level and rate of reactor power level change from the neutron detector 64. The current controller evaluates the difference between the current reactor power level and the demanded power level and the rate at which the current reactor power level is changing to determine which electromagnets need to be activated to achieve the desired power level change and then stabilize the reactor at the targeted power level. Reference character 52 figuratively illustrates the information supplied from the reactor control system to the current controller 62. Pre-established correlations between current supply, magnetic field strength, and magnetic particle density (reflector liquid displacement) and reactor power change rate (reactivity change) are included in the controller to enable the current supplied to each electromagnet to require the minimum amount of correction from the controlled feedback loop. In the event that electromagnet power is lost, the heavy magnetic particles will settle to the bottom of the fluid panel causing the reactor to shut down.

While the preferred embodiment was described in an application to nuclear fission rate control, this concept's application is well beyond the nuclear power environment. While the primary application of this concept is the control of the transmission of neutron radiation, the principle can be used to control the transmission of any form of electromagnetic or particulate radiation. As an example, the equilibrium magnetic particulate distribution may result in a fluid that is completely opaque. Applying current to electromagnets 1 and 5 could cause the center portion of the panel to become translucent or transparent. This application could be used to electrically control visible light transmission through a window. Accordingly, the term "albedo" as used herein shall be understood to include a measure of the transmissivity of any form of electromagnetic or particulate radiation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A device configured to control an intensity of a transmission of radiation from a source at a first location on a first side of the device to a second location on a second side of the device, the device comprising:
   a fluid reservoir;
   a Magneto-Rheological fluid comprising magnetically conductive particles that reflect neutrons, the Magneto-Rheological fluid occupying at least a portion of an interior of the fluid reservoir;
   a magnetic field generator for establishing a magnetic field across the Magneto-Rheological fluid; and
   a control system for controlling the magnetic field generator to vary the magnetic field across the Magneto-Rheological fluid to change an albedo of the device in accordance with a demand signal.

2. The device of claim 1 wherein the device is a nuclear reflector supported around at least a portion of a circumference of a core of a nuclear reactor, the nuclear reflector having at least a first state and a second state wherein a strength of the magnetic field is varied by the control system to change the nuclear reflector between the first and second states to change the albedo of the device.

3. The device of claim 2 wherein the magnetic field is established substantially parallel to an axial direction of the core of the nuclear reactor.

4. The device of claim 2 wherein the magnetic field is a plurality of discrete magnetic fields spaced around a circumference of the core of the nuclear reactor.

5. The device of claim 4 wherein the plurality of discrete magnetic fields are respectively established by a plurality of independently operated electromagnets.

6. The device of claim 1 including a monitoring system connected to the control system, configured to monitor the radiation on the first side of the device and generate and communicate the demand signal to the control system to adjust the magnetic field to control a level of the radiation on the first side of the device to a preselected level.

7. The device of claim 2 wherein the demand signal is a power demand signal of the nuclear reactor.

8. The device of claim 2 wherein the demand signal controls a level of the nuclear reactions within the core of the nuclear reactor by changing the magnetic field.

9. The device of claim 8 wherein the change in the magnetic field is the primary mechanism for controlling the nuclear reactions within the core during normal operation of the nuclear reactor.

10. The device of claim 2 wherein if power is lost to the magnetic field generator the Magneto-Rheological fluid transitions to a state that shuts down the reactor.

11. The device of claim 2 wherein the device alters the radial power distribution of the core.

12. The device of claim 2 wherein the device alters the axial power distribution of the core.

* * * * *